March 15, 1966 C. A. SCHROEDER ETAL 3,240,643
METHOD AND APPARATUS FOR MAKING A FLEXIBLE INSULATED DUCT
Filed April 12, 1962 5 Sheets-Sheet 1
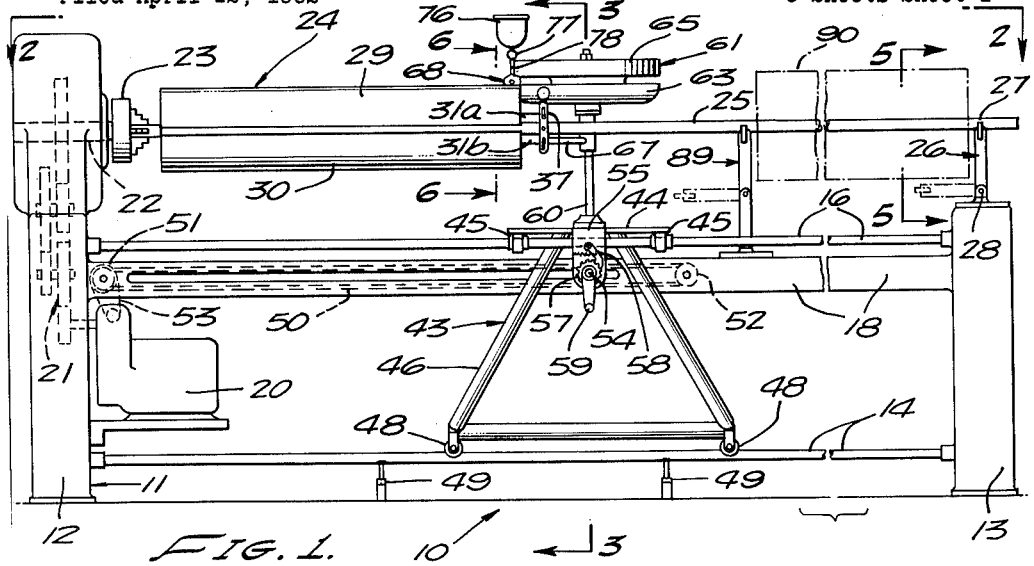
FIG. 1.
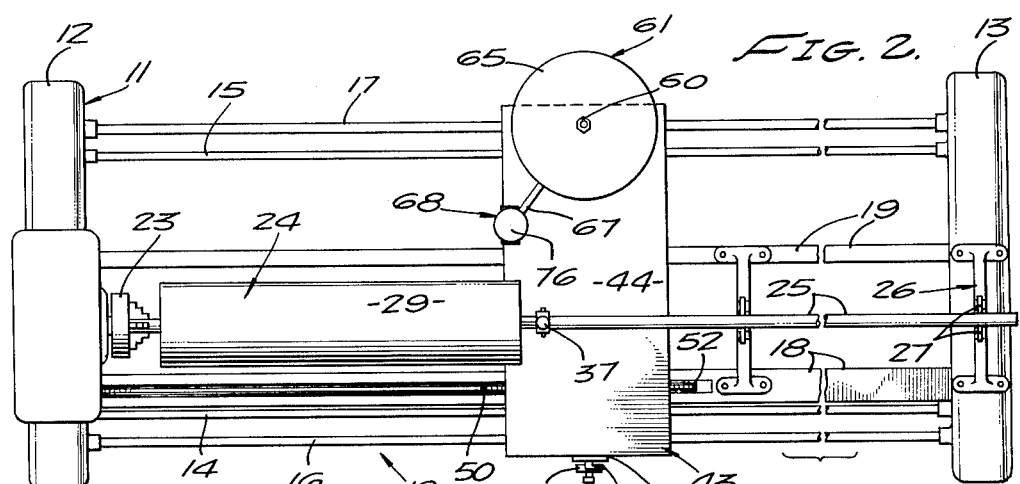
FIG. 2.
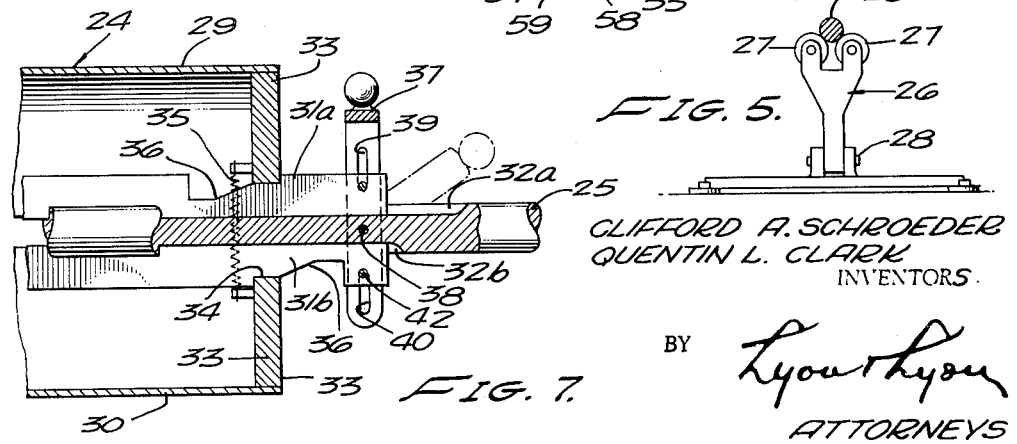
FIG. 5.
FIG. 7.
CLIFFORD A. SCHROEDER
QUENTIN L. CLARK
INVENTORS
BY Lyon & Lyon
ATTORNEYS

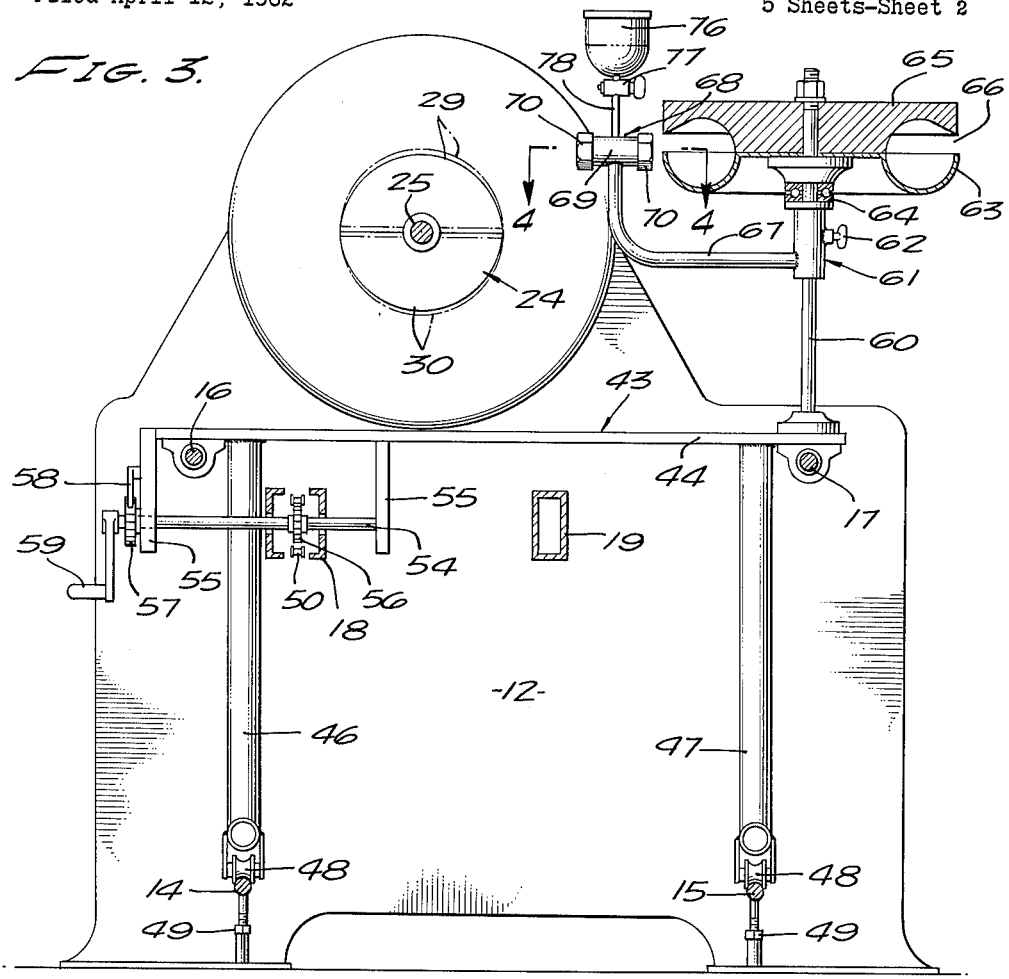
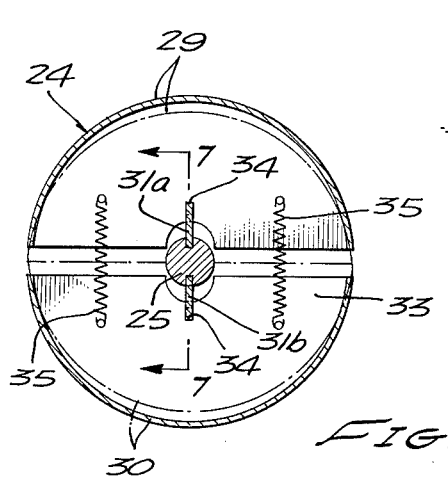
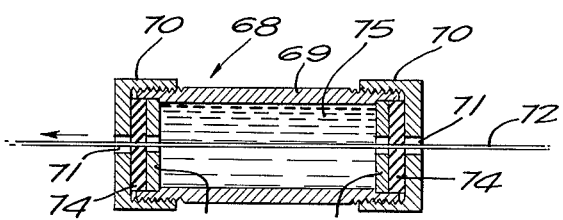
FIG. 3.
FIG. 4.
FIG. 6.
CLIFFORD A. SCHROEDER
QUENTIN L. CLARK
INVENTORS
BY Lyon & Lyon
ATTORNEYS March 15, 1966 C. A. SCHROEDER ETAL 3,240,643
METHOD AND APPARATUS FOR MAKING A FLEXIBLE INSULATED DUCT
Filed April 12, 1962 5 Sheets-Sheet 3
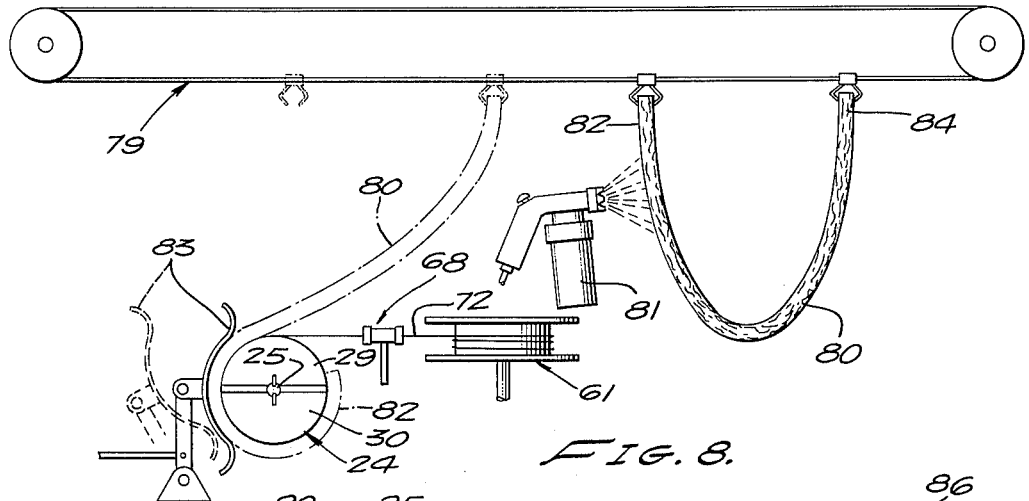
FIG. 8.
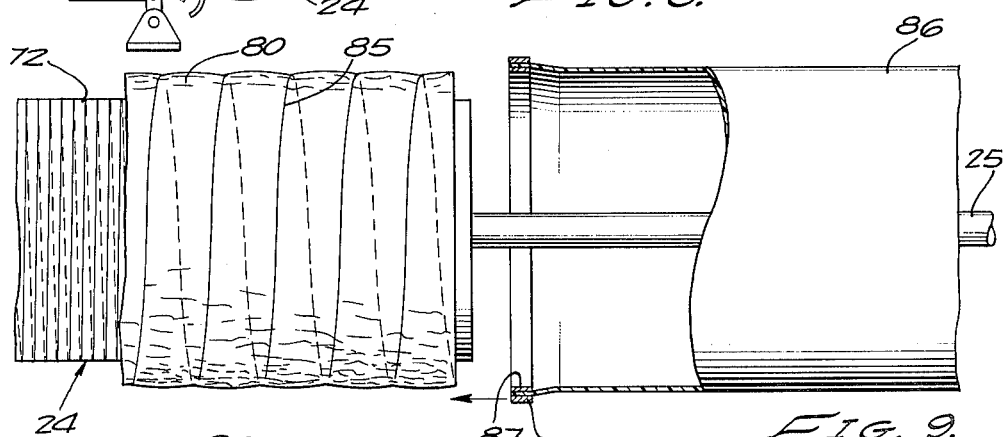
FIG. 9.
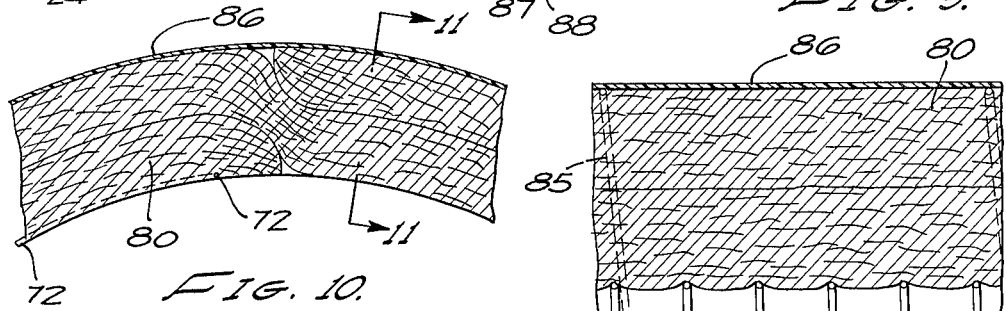
FIG. 10.
FIG. 11.
CLIFFORD A. SCHROEDER
QUENTIN L. CLARK
INVENTORS
BY Lyon & Lyon
ATTORNEYS March 15, 1966 C. A. SCHROEDER ETAL 3,240,643
METHOD AND APPARATUS FOR MAKING A FLEXIBLE INSULATED DUCT
Filed April 12, 1962 5 Sheets-Sheet 4
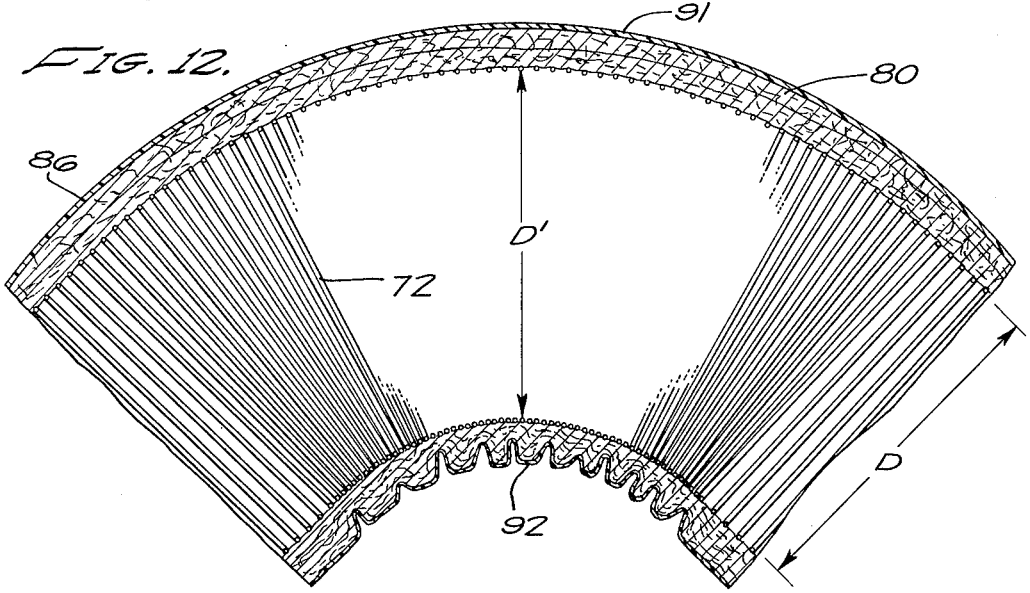
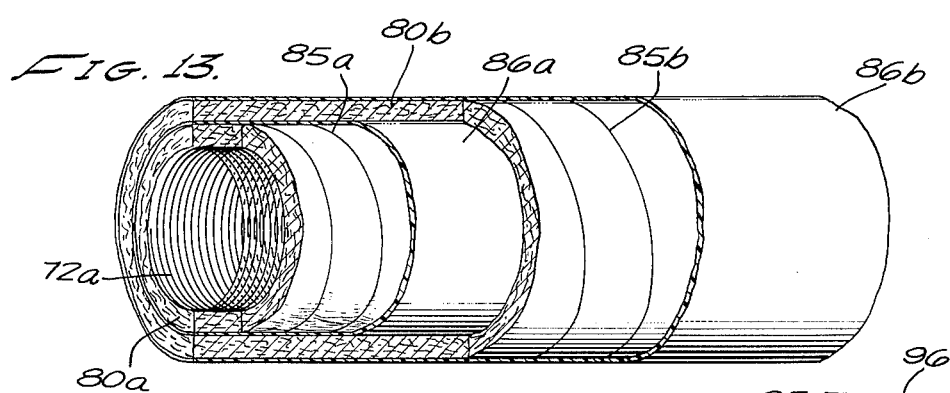
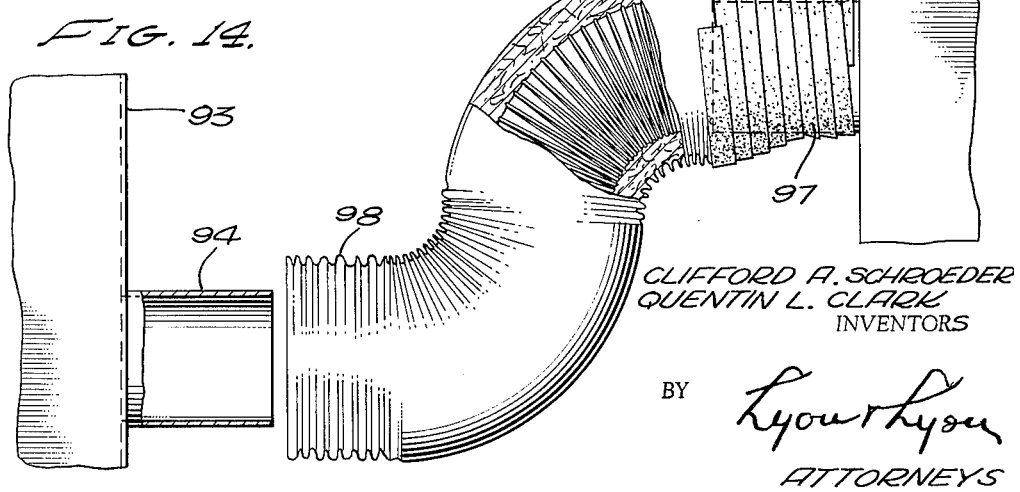
CLIFFORD A. SCHROEDER
QUENTIN L. CLARK
INVENTORS
BY *Lyon＆Lyon*
ATTORNEYS March 15, 1966  C. A. SCHROEDER ET AL  3,240,643
METHOD AND APPARATUS FOR MAKING A FLEXIBLE INSULATED DUCT
Filed April 12, 1962  5 Sheets-Sheet 5
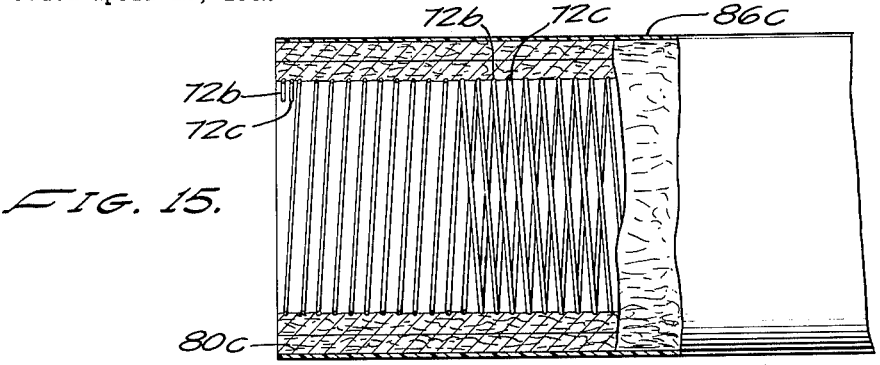
FIG. 15.
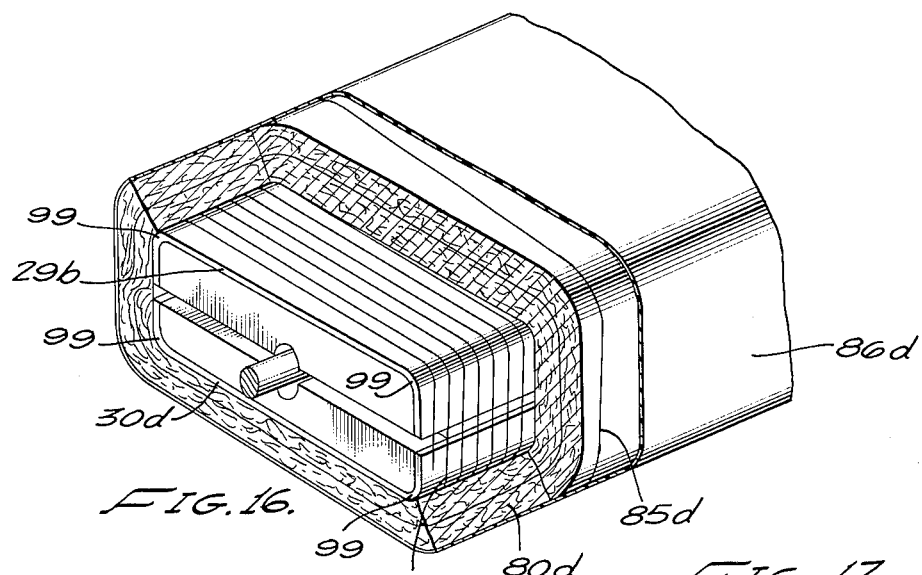
FIG. 16.
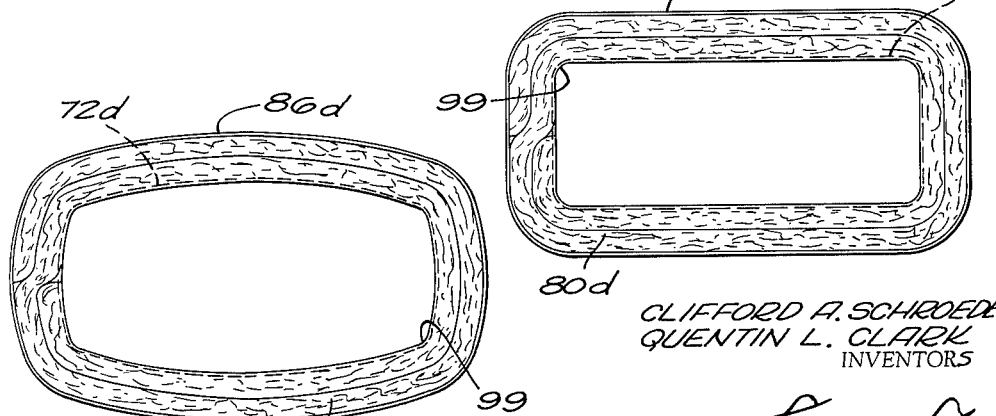
FIG. 17.
FIG. 18.
CLIFFORD A. SCHROEDER
QUENTIN L. CLARK
INVENTORS
BY *Lyon+Lyon*
ATTORNEYS United States Patent Office 3,240,643
Patented Mar. 15, 1966

3,240,643
METHOD AND APPARATUS FOR MAKING A
FLEXIBLE INSULATED DUCT
Clifford A. Schroeder, Los Alamitos, and Quentin L.
Clark, Sherman Oaks, Calif., assignors to Pittsburgh
Plate Glass Company, Pittsburgh, Pa., a corporation of
Pennsylvania
Filed Apr. 12, 1962, Ser. No. 187,120
7 Claims. (Cl. 156—143)

This invention relates to insulated ducts for conducting air or other gaseous fluids and a method and apparatus for manufacturing such a duct. In particular, this invention is directed to a duct of this type which is comparatively flexible and inexpensive for versatile and practical use.

There are numerous different types of ducts and conduits for transmitting air and other gases from one place to another. The particular purpose for transmitting the air or gas and the type of gas being transmitted greatly influences the physical requirements which are desired for a particular conduit or duct. In the heating and air-conditioning of various types of buildings, it has become relatively common to provide a central heating and air-conditioning system. In such a system, air is heated or cooled as desired and circulated through various ducts to the individual rooms for discharging the heated or cooled air into the room. The ducts are generally positioned within the ceilings, walls, attics, or between floors of multiple floor buildings.

It is generally necessary, or at least desirable, to insulate the air-conditioning and heating ducts for proper and efficient operation of the system. For example, in a typical residence or other single-level building having a central air-conditioning and heating system the ducts are commonly positioned in the attic with individual branch ducts leading to each room of the building. In the summer months, when the system is being used to cool the building, the air within the attic reaches relatively high temperatures and yet the air passing through the ducts is relatively cool for cooling the rooms. Thus, it has become common practice to use insulated ducts so that the heat transfer between the interior of the duct and the exterior of the duct is minimized to increase the overall efficiency and effectiveness of the system. Likewise, in the winter months when warm air is circulated through the ducts to heat the rooms, the temperature in the attic may be relatively low, so that the heat loss from the duct to the attic would be excessive if the ducts were not insulated.

It is relatively common practice in present commercial and residential installations to use sheet-metal ducts for conducting the heated or cooled air to the various rooms. These sheet-metal ducts are usually insulated with fiberglass insulation blankets, low density rock wool, etc., that are either wrapped around the exterior of the sheet-metal duct or are secured to the interior of the duct. In many commercial buildings, it is necessary to secure the insulation to the interior of the duct in order to provide acoustical insulation, so that sounds from one room are not transmitted through the duct to another room. Positioning the insulation on the interior of the duct also serves to reduce the noise level caused by the movement of air through the duct from the central system. Mounting the insulation on the interior of the ducts acoustically insulates the ducts due to the porous and fibrous nature of the insulation material.

Since air-conditioning and heating system ducting must extend throughout a building and is positioned in attics, walls, and between floors of multi-story buildings, the ducting often passes through extremely restricted spaces and around numerous corners and bends. Thus, for installation purposes, it is often desirable to have a flexible duct which can be readily passed through restricted spaces and around corners without requiring modification of the structure of the building or special construction. Although short lengths of flexible ducts are often used to pass through these restricted spaces and around corners, it is common practice to limit the use of this flexible ducting to these particular locations. This limited use of flexible ducting is a result of the higher cost per linear foot of flexible ducting as compared to rigid ducting and due to the poor air-flow characteristics of conventional flexible ducting. The air-flow characteristics of a duct are extremely important in that if a particular type of duct resists the flow of air therethrough to an objectionable degree, the size of the duct must be increased or the capacity of the air-circulating blower must be increased in order to pass a sufficient amount of air through that duct to accomplish the heating or air-conditioning. The resistance to air-flow through a duct is commonly referred to as the "static friction" of the duct which is measured by standard tests wherein air is passed through a predetermined length of duct and the pressure drop through the duct is observed. Since most conventional flexible ducts have an irregular or "corrugated" inner surface and such irregularity of the surface is increased by bending the duct around a corner, these ducts have a relatively high "static friction" characteristics. Thus, it is common to use relatively short lengths of flexible ducting and only where absolutely necessary, so that the use of the lengths of flexible ducting does not greatly affect the overall efficiency of the air-conditioning and heating system.

Accordingly, it is a principal object of this invention to provide a novel form of insulated duct and a method and apparatus for manufacturing such duct.

Another object of this invention is to provide a flexible insulated duct which is relatively inexpensive to manufacture and lends itself to easy installation.

A further object of this invention is to provide a novel form of insulated duct wherein the insulation is exposed to the interior of the duct for producing acoustical insulation as well as thermal insulation.

A still further object of this invention is to provide a flexible insulated duct wherein the internal surface of the duct is relatively smooth to produce good air-flow characteristics through the duct. A more specific object is to produce such a duct wherein bending of the duct around a corner does not appreciably affect the smooth interior surface and, thus, the good air-flow characteristics of the duct are maintained in the bent condition.

Another object of this invention is to provide a novel form of insulated duct wherein the insulation is exposed to the interior of the duct for sound insulation and yet mechanically supported from the interior of the duct to maintain a smooth and regular interior surface.

A further object of this invention is to provide a method and apparatus for rapidly and inexpensively manufacturing a flexible insulated duct. Another and more detailed object is to provide such a method and apparatus for manufacturing the duct wherein there is no heat-curing step or apparatus required in making the duct.

Other and more detailed objects and advantages of this invention will appear from the following description and the accompanying drawings.

In the drawings:

FIGURE 1 is an elevation view of the apparatus of this invention for accomplishing the method of this invention.

FIGURE 2 is a sectional plan view of the apparatus taken substantially on the line 2—2 as shown in FIGURE 1.

FIGURE 3 is a sectional elevation view of the apparatus taken substantially on the line 3—3 as shown in FIGURE 1.

FIGURE 4 is a sectional plan view of the adhesive applicator of the apparatus taken substantially on line 4—4 as shown in FIGURE 3.

FIGURE 5 is an elevation view of one of the steady-rest devices of the apparatus taken substantially on the line 5—5 as shown in FIGURE 1.

FIGURE 6 is a sectional elevation view of the expanding mandrel of the apparatus taken substantially on the line 6—6 as shown in FIGURE 1.

FIGURE 7 is a sectional elevation view of the expanding mandrel taken substantially on the line 7—7 as shown in FIGURE 6.

FIGURE 8 is a schematic elevation illustration of some of the steps employed in the method of this invention.

FIGURE 9 is a fragmentary sectional view of a partially completed duct of this invention and showing one of the steps for completing the duct.

FIGURE 10 is a fragmentary sectional view of a completed duct with the plane of the section taken perpendicular to the axis of the duct.

FIGURE 11 is an enlarged longitudinal fragmentary sectional view of the duct taken substantially on the line 11—11 as shown in FIGURE 10.

FIGURE 12 is a sectional view of the duct of this invention taken substantially on the axis of the duct and illustrating the duct as being flexed to bend around a 90° corner.

FIGURE 13 is a fragmentary sectional view of a modified form of the duct of this invention.

FIGURE 14 is an elevation view of our duct being installed between two sheet metal conduits with portions in cross-section for illustrating the flexibility of the duct.

FIGURE 15 is a fragmentary sectional view of a second modified form of this invention.

FIGURE 16 is a fragmentary sectional view of a third modified form of a duct of this invention, and of the collapsing mandrel used in manufacturing such form.

FIGURE 17 is a cross-sectional view of the modified form of the duct shown in FIGURE 16.

FIGURE 18 is a cross-sectional view similar to FIGURE 17, showing the modified form of duct shown in FIGURES 16 and 17 in its non-strained condition as it would appear after removal from the collapsing mandrel.

Referring now to the drawings, means are provided for mechanically performing some of the steps of the method of this invention, and producing the duct of this invention; and, as shown in the drawings, these means may include the apparatus generally designated and hereinafter referred to as machine 10. The machine 10 includes a frame 11 having spaced end members 12 and 13 connected by a pair of lower rods 14 and 15, a pair of upper rods 16 and 17, and a pair of longitudinal beams 18 and 19. A motor 20 is mounted on the end member 12 and through various gears and drive means, generally designated 21, is adapted to rotate a spindle 22 on which is mounted a chuck 23.

A collapsing mandrel assembly, generally designated 24, is provided with a shaft 25 which may be removably mounted in the chuck 23 and extends longitudinally to a position above the end member 13. A steady-rest assembly 26 is mounted on the end member 13 and has a pair of spaced rollers 27 for rotatably supporting the shaft 25. The steady-rest 26 is pivoted at pin 28 so that the steady-rest may be moved out of engagement with shaft 25 as shown by the phantom lines in FIGURE 1. A pair of semi-cylindrical mandrels 29 and 30 are provided in the collapsible mandrel assembly 24 and are adapted to move radially toward and away from each other, thereby forming a collapsible cylindrical mandrel.

Means are provided for expanding and collapsing the semi-cylindrical mandrels 29 and 30 and, as shown in FIGURES 6 and 7, these means may include a pair of cam bars 31a and 31b slidably mounted in key ways 32a and 32b, respectively, in the shaft 25. The semi-cylindrical mandrels 29 and 30 are each provided with two or more semi-circular flanges 33 having slots 34 therein for slidably engaging the cam bars 31a and 31b. A pair of tension springs 35 extend between each flange 33 on mandrel 29 to an adjacent flange 33 on mandrel 30 for biasing the mandrels 29 and 30 toward each other. The cam bars 31a and 31b each have cam surfaces 36 which cause radial movement of the associated semi-cylindrical mandrel upon axial movement of the cam bar. A lever 37 is provided and pivoted by pin 38 passing through shaft 25. The lever 37 has a pair of slots 39 and 40 on either side of the shaft 25 which engage pins 41 and 42, respectively, mounted on cam bars 31a and 31b, respectively. With the lever 37 in the vertical position shown in FIGURE 7, the semi-cylindrical mandrels 29 and 30 are separated by the maximum amount and substantially form a cylindrical mandrel as shown in FIGURE 6. When it is desirable to collapse the mandrel, the lever 37 is moved to the position shown by phantom lines in FIGURE 7, thus, moving the cam bars 31a and 31b in opposite axial directions so that the cam surfaces 36 permit the mandrels 29 and 30 to move radially toward each other and assume a position illustrated by the phantom lines shown in FIGURE 6. Thus, a duct which has been formed, as hereinafter described, on the mandrels 29 and 30 in their expanded positions may be easily removed when the mandrels 29 and 30 are collapsed toward each other.

A table assembly generally designated 43 is slidably mounted on the frame 11 of the machine 10 for longitudinal movement relative to the frame 11. The table assembly 43 may include a platform 44 having bearings 45 slidably engaging the upper rods 16 and 17. A pair of A-frame supports 46 and 47 are mounted on the lower side of the platform 44 and have rollers 48 for engaging the lower rods 14 and 15, respectively. The frames 46 and 47 and associated rollers 48 aid in the supporting and guiding of the platform 44. The lower rods 14 and 15 may be provided with leveling screws 49 for leveling and supporting the lower rods 14 and 15.

Means are provided for longitudinally moving the table assembly 43 in synchronization with the rotation of the collapsible mandrel assembly 24 and as shown in the drawings these means may include a continuous roller chain 50 passing over spaced sprockets 51 and 52 rotatably mounted on the longitudinal beam 18. Sprocket 51 may be driven by a chain drive 53 directly from the motor 20 or by any convenient drive means (not shown) from the gears and drive means 21. Although it is not essential, we prefer that the motor 20, drive means 21, and chain drive 53 be adjustably variable so that the linear advancement of the table assembly 43 along the mandrel assembly 24 per each revolution of the mandrel assembly 24 may be varied as desired for different sizes and requirements of the finished duct.

A shaft 54 is rotatably mounted in a pair of brackets 55 extending downwardly from the platform 44 such that the shaft passes through a slot in the beam 18 and between the strands of the roller chain 50. A sprocket 56 is secured to the shaft 54 and engages only the upper strand of the roller chain 50. A ratchet wheel 57 is mounted on the shaft 54 and an associated ratchet lever 58 is adapted to engage the ratchet wheel 57. When the ratchet lever 58 is in engagement with the ratchet wheel 57 as shown in FIGURE 1, the shaft 54 and sprocket 56 are prevented from rotating, thereby causing the roller chain 50 to pull the table assembly 43 longitudinally along the frame 11 as the chain 50 advances. When it is desired to stop the table assembly 43, the ratchet lever 58 is disengaged from the ratchet wheel 57, thereby permitting the shaft 54 and sprocket 56 to rotate as the upper strand of chain 50 advances. The handle 59 is provided and secured to shaft 54 for manually advancing the table assembly 43 as desired.

A post 60 is mounted on the platform 44 and a wire feeding assembly, generally designated 61, may be secured to the post 60 at any desired elevation by means of set screw 62. The wire feeding assembly 61 is provided with a wire cradle 63 rotatably supported by bearing 64 for rotation on a vertical axis. The wire cradle 63 is adapted to support a roll of wire and has a cover member 65 for retaining the roll of wire within the cradle. The cradle 63 and cover member 65 are vertically spaced from one another around their entire circumferences, as at 66, so that the wire may be fed from the cradle as the cradle rotates. The wire feeding assembly 61 is provided with an arm 67 for supporting the adhesive applicator assembly, generally designated 68.

The adhesive applicator assembly 68 includes a tubular member 69 threaded at each end for threadedly receiving cap members 70, as shown in FIGURE 4. The cap members 70 each have a central opening 71 for permitting the wire 72 to pass through the tubular member 69. A rigid washer 73 is mounted within each end of the tube 69 and a flexible washer 74 is positioned between each washer 73 and the associated cap member 70. The flexible washers 74 each have a central opening large enough for the wire 72 to pass through. The tubular member 69 is filled with an adhesive or glue 75 from a reservoir 76 by opening a valve 77 to allow the adhesive to pass from the reservoir to the tubular member 69 through a tube 78. By tightening the cap members 70 on the tubular member 69, the flexible washers 74 may be squeezed to tend to reduce the size of the central opening in the flexible washers, thereby increasing the amount of force necessary to pull the wire 72 through the adhesive applicator assembly 68 and reducing the amount of adhesive which is permitted to remain on the wire passing out of the applicator. By adjusting the cap members 70, the proper wire tension and adhesive application to the wire may be obtained.

Turning now to the manufacturing of a duct of this invention on the machine 10, a roll of wire is positioned in the cradle 63 and the end is threaded through the adhesive applicator 68. The table assembly 43 is positioned so that the glue applicator 68 is in line with one end of the mandrels 29 and 30. The mandrels 29 and 30 are adjusted to their expanded position and a mold release compound is applied to the exterior surfaces of the mandrels 29 and 30. The mold release compound may be of any conventional type which will inhibit the adhering of the adhesive-covered or glued wire to the mandrels. The end of the wire 72 is releasably secured to one end of the mandrels 29 and 30 by any convenient means, such as a clamp (not shown). The ratchet lever 58 is moved into engagement with the ratchet wheel 57 and the motor 20 is started for rotating the mandrel assembly 24 and moving the table assembly 43 along the frame of the machine. As viewed in FIGURE 3, the mandrel assembly 24 is rotated in a counterclockwise direction so that wire 72 is pulled straight through the adhesive applicator 68 in a line tangent to the outer surface of the mandrels 29 and 30. Since the table assembly 43 moves longitudinally as the mandrel assembly 24 is rotated, the wire 72 is applied to the mandrels 29 and 30 in a continuous helix as shown in the left-hand portion of FIGURE 9. The spacing between each convolution of wire 72 is established by the predetermined adjustment of the rate of longitudinal movement of the table assembly 43 relative to the rate of rotation of the mandrel assembly 24. Although this spacing between convolutions of wire may be greatly varied for various requirements and sizes of ducts, it has been found satisfactory to use a spacing of about ½ inch between wire convolutions in a duct having an internal diameter of six inches. If a structurally stronger or weaker duct is desired, the spacing may be decreased or increased, respectively, by adjusting the rate of movement of table assembly 43 relative to the rotation of the mandrel assembly 24. When the mandrels 29 and 30 are covered with the desired length of glued wire to produce the desired length of duct (usually the length of the mandrels), the wire is severed from the roll in cradle 63 and the end is releasably secured to the mandrels by any convenient means such as a clamp (not shown).

Referring now to FIGURE 8, the mandrel assembly 24 is schematically shown as pulling the wire 72 off the wire feeding assembly 61 and through the adhesive applicator 68. An overhead support apparatus, generally designated 79, may be provided above the machine 10 for supporting the blanket 80 of insulation material which is used in the duct. The blanket 80 has a width equal to the length of the duct which is being produced (generally the length of the mandrels 29 and 30, although the duct produced may be shorter). Although it is not essential, with some types of insulation blanket we prefer to apply a thin coat of glue, adhesive or other type of coating to the portion of the surface of the blanket 80 which is to be applied to the mandrels 29 and 30. This coating may be applied by any convenient means, such as spray gun 81. The thin coating on the blanket 80 may serve to enhance the adhesion of the blanket to the glued wire 72 and, also, may serve as a coating to prevent erosion of the insulation blanket when the duct is used, as will hereinafter be described. With the glued wire 72 wrapped onto the mandrels 29 and 30, one end 82 of the insulation blanket 80 is released from the support apparatus 79 and applied to the wire-covered mandrels 29 and 30 with end 82 positioned parallel to the axis of the mandrel assembly 24. The mandrel assembly 24 is then rotated to wrap the blanket 80 around the mandrels 29 and 30. A pressure pan 83 or series of rollers (not shown) may be provided and extend the length of the mandrels for engaging the outer surface of the blanket to hold the blanket uniformly on the mandrels and apply sufficient pressure to cause the blanket to adhere to the glue-coated wire. The pressure pan 83 may be moved out of engagement with the blanket for subsequent operations. The pressure pan 83 is omitted from FIGURES 1, 2, and 3 for clarity of illustration of those figures. After the blanket 80 has been partially wrapped onto the mandrels 29 and 30, the other end 84 of the blanket is released from the support apparatus 79 and the entire blanket is wrapped around the mandrels.

Although as many wraps of insulation blanket 80 may be made as is desired or required for the particular duct, FIGURE 8 (and FIGURES 10 and 11) shows a sufficient length of blanket to make two wraps around the mandrels. The number of wraps of insulation blanket which are used will obviously depend on the insulation quality of the blanket and the desired insulation properties of the completed duct. We prefer to use an insulation blanket which is compressible and yet has some resistance to length-wise and width-wise stretching of the blanket, such as, but not limited to: fiberglass insulation blankets of a typical density of 0.3 to 1.0 pounds per cubic foot, low-density rock wool, flexible plastic foam insulation, or rotary fiberglass insulation blanket.

A tie cord 85, such a conventional fiber glass tie cord, is then wrapped around the outside of the insulation blanket 80 in a continuous helix and slightly compresses the blanket 80. The convolutions of the tie cord 85 are substantially spaced one from another as shown in FIGURE 9, the actual spacing depending on such factors as the size of the duct and the wall thickness of the insulation. A flexible sleeve 86 of a length equal to the length of the duct which is being produced is then positioned on the shaft 25 by moving the steady rest 26 out of engagement with the shaft 25. The sleeve 86 may be of any conventional material, but it is more desirable if the material is relatively flexible, relatively unaffected by the temperature changes to which the duct is to be subjected, and sufficiently inexpensive to be used without greatly increasing the overall cost of the duct. Various types of thin vinyl plastic sleeves have been found to be satisfactory.

A pair of hoops 87 and 88 are used to facilitate the installation of the sleeve 86 over the exterior of the insulation blanket 80. The smaller hoop 87 is inserted inside of the sleeve 86 and the larger hoop 88 is fitted over the exterior of the sleeve, thereby clamping the sleeve between the hoops as shown in FIGURE 9. With the sleeve 86 positioned loosely on the shaft 25, the steady rest 26 is moved into engagement with the shaft and a steady rest 89, similar to steady rest 26, is moved out of engagement with shaft 25. The sleeve 86 is then pulled over the exterior of the insulation blanket 80 and is preferably of a size to slightly compress the insulation blanket 80. The hoops 87 and 88 may then be removed and the ends of the wire 72 unclamped from mandrels 29 and 30. The mandrels 29 and 30 are then collapsed toward each other, as previously described, and the completed duct may be slid off the mandrels to the position illustrated by the phantom lines 90 in FIGURE 1. Steady rest 89 may then be moved into engagement with shaft 25 and steady rest 26 moved out of engagement with shaft 25 for removing the completed duct off the end of the shaft. The steady rests 26 and 89 are used as described merely to support the collapsible mandrel assembly 24 during rotation and during the steps of installing the sleeve 86 and removing the completed duct only because of the weight of the mandrel assembly 24 and the inadvisability of supporting such an assembly only from the chuck 23 and spindle 22.

The insulated duct of our invention is completed by the installation of the sleeve 86 and it will be noted that no heat curing is necessary in producing our flexible insulated duct. The outer surfaces of the mandrels 29 and 30 may be cleaned with an appropriate solvent to remove the excess glue and mold release compound, and new coating of mold release compound may be applied for producing another duct in the same manner as heretofore described.

In our finished duct, the insulation blanket 80 is exposed to the interior of the duct thereby producing the desired acoustical insulation as well as providing a thermally insulated duct. The wire 72 may be of any convenient size, cross-section and material. The term wire as used throughout this application, including the claims, is intended to mean and include any element in the form of a slender rod whether comprised of metal, plastic, resin-coated fiber or other material and whether circular or non-circular in cross-section, if that element exhibits characteristics of relative flexibility, resiliency and strength. Since the wire 72 is also exposed to the interior of the duct, we prefer to use a wire comprised of a material which resists corrosion. We have found copper wire to be highly satisfactory although other types of wire, as heretofore defined, may be used. Although the wire 72 is deformed somewhat by being wrapped on the mandrels 29 and 30 to form circular convolutions, when the wire is unclamped from the mandrels and the mandrels are collapsed the wire tends to expand slightly outwardly and become imbedded in the inner surface of the insulation blanket 80. As shown in FIGURE 11, the inner surface of the duct is relatively straight and smooth since the wire only imbeds itself in the insulation blanket to a depth about equal to the diameter of the wire. The wire continually tends to expand outwardly due to its own resiliency. The wire is prevented from excessive circumferential expansion due to the insulation blanket having a certain amount of strength to resist circumferential stretching and the wire being secured by adhesive to the insulation blanket. Further, radial expansion of the entire duct is limited by the sleeve 86 and tie cord 85.

It has also been found that it is unnecessary to use a tie cord 85 if a sufficiently strong sleeve 86 is used which will resist the radial expansion of the entire duct. When the tie cord 85 is omitted, it has been found satisfactory to use a length of non-adhesive cellophane tape which is wrapped helically around the insulation blanket to compress the blanket for ease in pulling the sleeve 86 over the blanket 80. The convolutions of cellophane tape are widely separated so that when the sleeve is in the proper position the tape may be released and pulled out from between the sleeve 86 and the blanket 80.

Since the insulation blanket 80 is easily compressed the overlapping of wraps of insulation blanket do not form excessive bulges in the finished duct as may be seen in FIGURE 10. The spacing between convolutions of wire 72 is maintained due to being secured to the insulation blanket in spaced relationship and the insulation blanket having sufficient longitudinal strength to resist axial elongation of the entire duct. When the duct is flexed around a corner, as shown in FIGURE 12, the outer radius portion 91 of the duct merely bends and does not elongate lengthwise, whereas the inner radius portion 92 of the duct is compressed so that the adjacent convolutions of wire 72 are brought closer together while the insulation blanket merely compresses and the sleeve 86 assumes a folded condition around the curve. The wires 72 remain secured to the insulation blanket so that if the duct is returned to its original straight condition the convolutions of wires will return to their original spaced condition. The cylindrical configuration of the duct is structurally maintained only by the convolutions of wire 72 since the insulation blanket 80 is flexible and compressible and the sleeve 86 is also flexible. As the duct is flexed around a corner as in FIGURE 12, the circular cross-section of the duct is substantially maintained by the convolutions of wire 72 and, therefore, the inside diameter D' of the duct at the bend is substantially the same as the normal diameter D of the duct. The relatively smooth interior surface of the duct is not adversely affected by flexing the duct around a corner since the insulation blanket is merely compressed rather than bulging inwardly.

The adhesive which is applied to the wire by the applicator 68 may be any conventional glue or adhesive, although we prefer to use a non-flammable type for safety and to comply with some building ordinances and codes. The glue or adhesive is also preferably of a type which remains flexible after setting, so that the duct may be flexed without damaging the bond between the wire and insulation blanket. We have found various rubber-base adhesives to be satisfactory, such as the adhesive manufactured and sold under the trademark Hypolon by the Lurado Manufacturing Co. of Anaheim, California, and those which may be thinned with methylene chloride or other non-flammable type thinners. The adhesive, glue, or coating which is sprayed on the insulation blanket may be of the same or a similar type which will inhibit fiber erosion of the insulation blanket when air flows through the duct.

In the modified form of our duct shown in FIGURE 13, the wire 72a is glued and wound onto a collapsible mandrel and one or more wraps of insulation blanket 80a are wrapped onto the wire as previously described. A tie cord 85a may then be applied and a sleeve 86a installed as previously described. One or more additional wraps of insulation blanket 80b are then wrapped around the sleeve 86a, a tie cord 85b is applied, and an outer flexible sleeve 86b is installed over the entire assembly. This modified form of duct is adapted to withstand higher internal air pressures than the duct previously described due to the double sleeves 86a and 86b.

In the modified form of our invention shown in FIGURE 15 the wire framework is comprised of two separate continuous wires 72b and 72c wound onto a collapsible mandrel side-by-side at the same time in a manner similar to our preferred form. For making this modified form on the machine 10, the machine is preferably provided with two separate wire feeding assemblies 61 and adhesive applicators 68 to accommodate the two separate wires. The wires are coated with adhesive and an insulation blanket 80c is wrapped around the wires in the manner previously described. A flexible sleeve 86c is also installed in the previously described manner. Likewise, more than two separate wires could be used if so desired.

In the modified form of our invention shown in FIGURES 16, 17, and 18, the semi-cylindrical mandrels 29 and 30 of the collapsible mandrel assembly 24 are replaced with rectangular mandrels 29d and 30d. The mandrels 29d and 30d have rounded corners 99 to prevent excessive stressing of the wire 72d as the wire is wound onto the mandrels in a manner substantially the same as previously described. The mandrels 29d and 30d are collapsible toward each other the same as mandrels 29 and 30. The wire 72d is glued and wrapped onto the mandrels 29d and 30d, the insulated blanket 80d is wrapped around the glued wire and mandrels, and the tie cord 85d is applied, all in a manner similar to the manner previously described. A flexible sleeve 86d is installed in a manner similar to the installation of sleeve 86, except that hoops of a rectangular shape are used instead of the circular hoops 87 and 88. This duct will have a rectangular cross-section as shown in FIGURE 17 while the duct is still on the mandrels 29d and 30d, but when removed from the mandrels will tend to assume an irregular rectangular cross-section similar to that shown in FIGURE 18. This form of duct is particularly useful in relatively flat restricted spaces since although the duct normally has the configuration shown in FIGURE 18 the sides may be pressed in to force the duct into the configuration shown in FIGURE 17, thereby maximizing the cross-sectional air-flow area while minimizing the lateral dimensions of the duct.

In some air conditioning and heating system installations it is necessary to fit a duct between two previously installed ducts, plenums, or registers to transmit air from one to the other. In FIGURE 14 is shown a main air plenum 93 with a cylindrical conduit 94 tap-off opening which is to be connected to the cylindrical conduit 95 of the register 96. As shown the conduits 94 and 95 may be substantially offset from one another. The duct of our invention is inserted over one of the conduits, shown on conduit 95, and an adhesive tape 97 is spiral-wrapped onto the conduit and onto the outside of the duct, thereby securing the duct to the conduit and forming an air-tight seal. Note that the tape 97 compresses the end of the duct. The other end of the duct may then be compressed, as at 98 and inserted over the conduit 94. The high flexibility and compressibility of our duct makes such an installation relatively easy whereas conventional ducts would be difficult to install.

Thus it may be seen that we have provided a method and apparatus for making a duct which is relatively inexpensive, easy to install, has good air-flow characteristics, and is both thermal and acoustical insulating. The structure of our duct is such that the range of thermal insulating properties which may be obtained is not limited since it is merely necessary to provide more or fewer wraps of insulation blanket or to provide a different type of insulation blanket as requirements dictate. The interior surface of our duct is relatively smooth and consistent in cross-sectional flow area even though the duct is flexed around the corner.

Having fully described our invention, it is to be understood that we do not wish to be limited to the details herein set forth or to the details illustrated in the drawings, whether such details be as to structure or materials, but our invention is of the full scope of the appended claims.

We claim:

1. A method for making a thermally and acoustically insulated duct comprising the steps of: forming a stiffly flexible element into a plurality of spaced convolutions to form a helix, convolutely wrapping a compressible blanket of porous insulating material having a width equal to the duct length around said plurality of convolutions, and encircling and only slightly compressing said blanket with a flexible sleeve for conforming to the surface of and serving as a covering for the blanket.

2. A method for making a thermally and acoustically insulated duct comprising the steps of: forming a helix of wire having spaced convolutions, convolutely wrapping a compressible blanket of porous insulating material having a width equal to the duct length around said helix solely in a circumferential and nonhelical direction, adhering said blanket to said wire helix, and encircling said blanket with a flexible sleeve for conforming to the surface of and serving as a covering for the blanket.

3. A method for making a thermally and acoustically insulated duct comprising the steps of: applying an adhesive to a continuous length of wire, forming said wire into a helix having spaced convolutions, convolutely wrapping a compressible blanket of porous insulating material having a width equal to the duct length around said helix, retaining said blanket in susbtantially uncompressed condition, and pulling a continuous flexible sleeve over the blanket to conform to the surface of the blanket and serve as a covering therefor.

4. A method for making a thermally and acoustically insulated duct on a collapsible mandrel comprising the steps of: applying an adhesive to a continuous length of wire, wrapping said wire around the mandrel in spaced convolutions, convolutely wrapping a compressible blanket of porous insulating material having a width equal to the duct length around said wire and mandrel, retaining said blanket in substantially uncompressed condition, pulling a flexible sleeve over the blanket to conform to the surface of the blanket and serve as a covering therefor and collapsing the mandrel for removing the assemblage of wire, blanket and sleeve as comprising the duct.

5. A method for making a thermally and acoustically insulated duct on a collapsible mandrel comprising the steps of: applying an adhesive to a continuous length of wire, wrapping said wire around the mandrel in spaced convolutions, convolutely wrapping a compressible blanket of porous insulating material having a width equal to the duct length around said wire and mandrel in a manner whereby the porous insulation material forms a substantial portion of the interior of the duct, pulling a flexible sleeve over the blanket to conform to the surface of the blanket and serve as a covering therefor, and collapsing the mandrel for removing the assemblage of wire, blanket and sleeve as comprising the duct with the sleeve remaining positioned on the blanket.

6. A method for making a thermally and acoustically insulated duct on a collapsible mandrel comprising the steps of: applying an adhesive to a continuous length of wire, wrapping said wire around the mandrel in spaced convolutions, applying an adhesive to the surface of a blanket of compressible and porous insulating material having a width equal to the length of the duct, convolutely wrapping said blanket around said wire and mandrel with the adhesive coated surface adjacent the mandrel, pulling a flexible sleeve over the blanket to conform to the surface of the blanket and serve as a covering therefor, and collapsing the mandrel for removing the assemblage of wire, blanket and sleeve as comprising the duct with the sleeve remaining positioned on the blanket.

7. In an apparatus for making a duct employing an adhesive coated wire framework, the combination of: a frame, a collapsible mandrel rotatably mounted on said frame, a table slidably mounted on said frame for movement along said mandrel, means on said table for guiding the wire and applying adhesive to the wire, means for rotating said mandrel, means for moving said table along said mandrel synchronously with the rotation of said mandrel for feeding the adhesive coated wire onto said mandrel in a continuous helix having spaced convolutions, and means for supporting a porous compressible insulation blanket with one edge parallel to the axis of rotation of said mandrel for applying another and parallel edge of said blanket to the wire and mandrel in a line parallel to said axis of rotation.

References Cited by the Examiner

UNITED STATES PATENTS

| | | | |
|---|---|---|---|
| 1,901,330 | 3/1933 | Poberejsky | 138—134 X |
| 2,106,018 | 1/1938 | Raiche | 156—425 |
| 2,312,282 | 2/1943 | Peet | 138—137 |
| 2,342,647 | 2/1944 | Denman | 138—137 |
| 2,557,932 | 6/1951 | Baymiller | 156—171 X |
| 2,597,806 | 5/1952 | Martin | 156—143 |
| 2,729,268 | 1/1956 | Broughton et al. | 156—425 X |
| 2,748,831 | 6/1956 | Nash | 156—425 |
| 2,858,854 | 11/1958 | Daggett | 138—131 X |
| 2,861,598 | 11/1958 | Carder et al. | 138—133 |
| 2,943,644 | 7/1960 | Moseley | 138—139 X |
| 2,980,144 | 4/1961 | Edwards et al. | 138—131 X |
| 3,083,130 | 3/1963 | Strandquist | 156—446 X |
| 3,106,504 | 10/1963 | Carter | 242—7 X |
| 3,143,306 | 8/1964 | Dijkmans et al. | 242—7 |

FOREIGN PATENTS

Ad. 14,850   1884   Great Britain.
854,528   11/1960   Great Britain.

EARL M. BERGERT, *Primary Examiner.*

EDWARD V. BENHAM, *Examiner.*

L. G. FOSTER, P. DIER, *Assistant Examiners.*